United States Patent Office 3,516,817
Patented June 23, 1970

3,516,817
HERBICIDAL COMPOSITIONS AND METHODS UTILIZING ALKYLENEIMINOQUINAZOLINE-4-IMINO-2-ONE COMPOUNDS
Cecil W. Le Fevre, Anaheim, and Don L. Hunter, Long Beach, Calif., assignors to United States Borax & Chemical Corporation, Los Angeles, Calif., a corporation of Nevada
No Drawing. Filed June 7, 1967, Ser. No. 644,115
Int. Cl. A01n 9/22
U.S. Cl. 71—92                10 Claims

ABSTRACT OF THE DISCLOSURE

3 - alkyleneiminoquinazoline-4-imino-2-one compounds having 4–7 carbon atoms in the alkyleneimino ring are provided. The compounds are especially useful as herbicides and can be formulated to provide herbicidal compositions. At low application rates the compounds are useful as selective herbicides such as in peanuts, corn, safflower and cotton.

---

This invention relates to herbicidal compositions and methods utilizing 3-alkyleneiminoquinazoline-4-imino-2-one compounds as active ingredients. According to the present invention, there are provided herbicidal compositions containing compounds of the formula

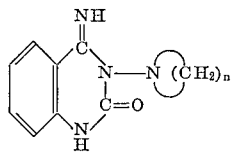

wherein $n$ is an integer of from about 4 to about 7, inclusive. Thus the alkyleneimino group can be tetramethyleneimino, pentamethyleneimino, hexamethyleneimino, heptamethyleneimino, and the like. There are also provided methods of controlling weed growth by application of the compounds of this invention.

The quinazoline-4-imino-2-ones of the present invention are generally crystalline solids which are soluble in the usual organic solvents such as alcohols, ether, benzene, and acetone. They are readily prepared by cyclization of the corresponding 1 - (2 - cyanophenyl)-3-alkyleneiminourea compounds, such as by heating at elevated temperatures. The preparation proceeds through the alkyleneiminourea compound by reaction of the corresponding N-aminoalkylimine with 2-cyanophenyl isocyanate at a temperature of above about 50° C. The preparation can be illustrated by the following equation in which $n$ has the significance previously assigned.

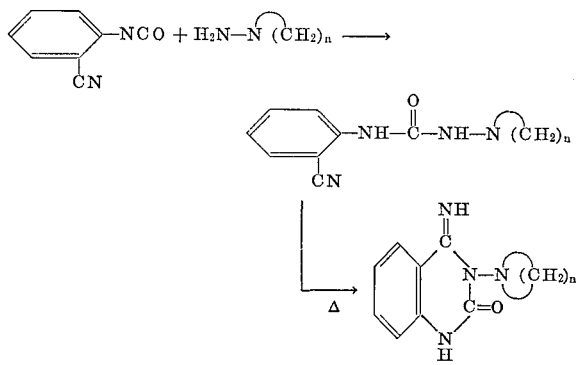

The reaction takes place preferably in the presence of a solvent having a boiling point of at least about 60° C., such as benzene and toluene. The resultant 3-alkyleneiminoquinazoline-4-imino-2-one is isolated and purified by conventional procedures, such as recrystallization from a suitable solvent, such as benzene or ethanol.

The intermediate 2-cyanophenyl isocyanate can be prepared by reaction of 2-cyanoaniline with phosgene according to known procedures.

The following examples are presented to illustrate preparation of typical compounds of the invention but the scope of the invention is not to be considered limited to the specific examples given.

EXAMPLE I

3-pentamethyleneiminoquinazoline-4-imino-2-one

A 200 ml. one-necked, round-bottomed flask equipped with a magnetic stirrer and reflux condenser was charged with 1.75 grams (0.017 mole) of N-aminopentamethyleneimine, 2.50 grams (0.017 mole) of 2-cyanophenyl isocyanate and 50 ml. of toluene. The reaction mixture was refluxed for 17 hours. The solution was allowed to stand in a refrigerator overnight whereupon the product crystallized. The product was isolated by filtration and dried giving 3.49 grams (82.1%) of white crystals which melted at 182°–185° C. After recrystallization from benzene, the product melted at 189°–192.5° C.

EXAMPLE II

3-hexamethyleneiminoquinazoline-4-imino-2-one

A 100 ml. one-necked, round-bottomed flask equipped with a magnetic stirrer and reflux condenser was charged with 1.98 grams (0.017 mole) of N-aminohexamethyleneimine, 2.50 grams (0.017 mole) of 2-cyanophenyl isocyanate and 50 ml. of benzene. The reaction mixture was refluxed for 4 hours. The reaction mixture was then evaporated to dryness on a Rinco evaporator, and the solid residue was dissolved in 300 ml. of a refluxing 1:2 mixture of benzene-hexane. On cooling, the product crystallized and was isolated by filtration and dried to give 3.12 grams (69.8%) of white needles; M.P. 169.5°–171° C. After recrystallization from ethanol, the product melted at 168°–169.5° C.

Other compounds embraced by the present invention which can be prepared according to the general procedure described above are 3-tetramethyleneiminoquinazoline-4-imino - 2 - one and 3-heptamethyleneiminoquinazoline-4-imino-2-one.

The quinazoline-4-imino-2-one compounds of this invention are effective herbicides useful for controlling weeds. "Weeds" as used herein is intended to include any plant growth which is undesirable. The compounds are useful as a pre-emergence of post-emergence treatment; that is, they can be used to kill or suppress the growth of plants or to kill or prevent the emergence of seedlings of unwanted plants. Thus, the compounds can be used to control the growth of weeds by applying a phytotoxic amount to the locus of the weeds, that is, the foliage of the growing plants or soil in which the weeds are growing or would grow. Generally an application rate of from about 0.5 to about 25 pounds of one or more of the active compounds per acre is an effective phytotoxic amount although greater or lesser amounts can be used if desired. The presently preferred rate of application is in the range of from about 1 to about 15 pounds per acre. At lower application rates the compounds have selective activity and are especially useful for controlling weed growth in desirable crops such as peanuts (groundnuts), corn, safflower and cotton.

The following examples illustrate the herbicidal activity of respresentative compounds of this invention.

EXAMPLE III

Greenhouse flats were planted to peanuts and the weed species, mustard, bindweed, ragweed, velvetleaf, lamb's-quarter, pigweed, foxtail, cheat, water grass, wild oats, Johnson grass, and crabgrass. When the plants were about 1–3 inches tall, they were sprayed with an ethanol-dioxane solution of 3-pentamethyleneiminoquinazoline-4-imino-2-one at a rate of 4 pounds per acre. Thirty-six days after treatment, the flats were evaluated for herbicidal activity and rated on a 0 to 10 scale in which 0=no effect and 10=100% kill. The results obtained were recorded as follows:

| Weed: | Herbicidal effect |
|---|---|
| Mustard | 10 |
| Bindweed | 9 |
| Ragweed | 6 |
| Velvetleaf | 10 |
| Lamb's-quarter | 10 |
| Pigweed | 0 |
| Foxtail | 7 |
| Cheat | 8 |
| Water grass | 10 |
| Wild oats | 10 |
| Johnson grass | 9 |
| Crabgrass | 10 |
| Peanuts | 0 |

EXAMPLE IV

Greenhouse flats were planted to the twelve weed species, mustard, bindweed, ragweed, velvetleaf, lamb's-quarter, pigweed, foxtail, downy brome, water grass, wild oats, Johnson grass, and crabgrass. When the plants were about 1–3 inches tall, they were sprayed with a methanol-dioxane solution of 3-hexamethyleneiminoquinazoline-4-imino-2-one at an application rate of 2.5 pounds per acre. Thirty-three days after treatment, the flats were evaluated for herbicidal activity and rated on a 0 to 10 scale in which 0=no effect and 10=100% kill. The following results were recorded:

| Weed: | Herbicidal effect |
|---|---|
| Mustard | 10 |
| Bindweed | 10 |
| Ragweed | 10 |
| Velvetleaf | 10 |
| Lamb's-quarter | 10 |
| Pigweed | 6 |
| Foxtail | 3 |
| Downy brome | 10 |
| Water grass | 9 |
| Wild oats | 10 |
| Johnson grass | 7 |
| Crabgrass | 10 |

Since a relatively small amount of one or more of the active quinazoline-4-imino-2-one compounds should be uniformly distributed over the area to be treated, the compounds preferably are formulated with conventional herbicide carriers, either liquid or solid. Thus, the compounds can be impregnated on or admixed with a pulverulent solid carrier such as lime, talc, clay, bentonite, calcium chloride, vermiculite, calcium carbonate, and the like. Alternatively, the compounds can be dissolved or suspended in a liquid carrier such as water, kerosene, alcohols, Diesel oil, xylene, benzene, glycols, and the like. A surfactant preferably is included to aid in dispersion, emulsification and coverage. The surfactant can be ionic or nonionic, and may be a liquid or a solid. The use of the term "surfactant" herein is intended to include such compounds commonly referred to as wetting agents, dispersing agents, and emulsifying agents. Typical surfactants include the alkylarylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 90 percent by weight of one or more of the active quinazoline-4-imino-2-one compounds with a carrier or diluent, which may be a solid or liquid. Liquid carriers which are miscible with the active agent or other liquids in which the compounds may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides, such as the sodium borates, sodium chlorates, chlorophenoxyacetic acids, triazines, substituted ureas, uracils, carbamates, halobenzoic acids, haloalkanoic acids, anilides, pyridinols and picolinic acids, can be included in the formulations.

Reference is made to the copending application of Don L. Hunter, Ser. No. 644,114, filed on even date herewith, now Pat. No. 3,464,989 which describes and claims the novel 3-alkyleneiminoquinazoline-4-imino-2-ones.

Various changes and modifications of the invention can be made to the extent that such variations incorporate the spirit of this invention.

What is claimed is:

1. A herbicidal composition comprising a phytotoxic amount of a compound of the formula

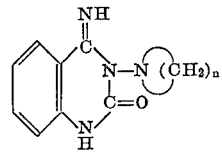

wherein $n$ is an integer of from 4 to 7, inclusive, and an inert carrier therefor.

2. A herbicidal composition according to claim 1 in which a surfactant is included.

3. A herbicidal composition according to claim 1 in which said compound is 3-pentamethyleneiminoquinazoline-4-imino-2-one.

4. A herbicidal composition according to claim 1 in which said compound is 3-hexamethyleneiminoquinazoline-5-imino-2-one.

5. The method of controlling weed growth which comprises applying to the locus of said weeds a phytotoxic amount of a compound of the formula

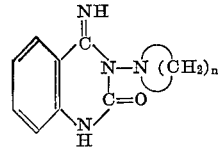

in which $n$ is an integer of from 4 to 7 inclusive.

6. The method according to claim 5 in which said compound is 3-hexamethyleneiminoquinazoline-4-imino-2-one.

7. The method according to claim 5 in which said compound is 3 - pentamethyleneiminoquinazoline - 4-imino-2-one.

8. The method of according to claim 5 in which said compound is applied at a rate of from about 1 to about 15 pounds per acre.

9. The method according to claim 5 in which said weed growth is in the presence of desirable crops.

10. The method according to claim 7 in which said weed growth is in the presence of peanuts.

References Cited

UNITED STATES PATENTS

| 3,244,503 | 4/1966 | Watts | 71—92 |
| 3,317,531 | 5/1967 | Reicheneder et al. | 71—92 |

JAMES O. THOMAS, JR., Primary Examiner

U.S. Cl. X.R.

71—82, 93, 111, 113, 115, 116, 94, 118, 120, 28

UNITED STATES PATENT OFFICE
CERTIFICATE OF CORRECTION

Patent No. 3,516,817   Dated June 23, 1970

Inventor(s) Cecil W. LeFevre and Don L. Hunter

It is certified that error appears in the above-identified patent and that said Letters Patent are hereby corrected as shown below:

Column 1, line 58, "$H_2N-N(CH_2)_n$" should be --$H_2N-N(CH_2)_n$--;

Column 1, line 63, 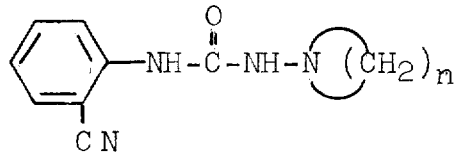

Column 2, line 54, "of" should be --or--;

Column 3, line 18, "Lamb's-quarter" should be --Lamb's quarter--;

Column 3, line 46, "Lamb's-quarter" should be --Lamb's quarter--;

Column 4, line 60, "5" should be --4--;

Column 5, line 4, after "method" delete "of".

SIGNED AND
SEALED
MAR 2 1971

(SEAL)
Attest:

Edward M. Fletcher, Jr.
Attesting Officer

WILLIAM E. SCHUYLER, JR.
Commissioner of Patents